(12) United States Patent
Chen et al.

(10) Patent No.: US 11,047,735 B1
(45) Date of Patent: Jun. 29, 2021

(54) DYNAMIC TIME GAIN CONTROLLING LIGHT SENSING DEVICE COMPRISING A DYNAMIC TIME GAIN ADJUSTMENT MODULE TO CONTROL A PLURALITY OF GAIN SELECTION SWITCHES

(71) Applicant: ANPEC ELECTRONICS CORPORATION, Hsinchu (TW)

(72) Inventors: Chih-Ning Chen, Taipei (TW); Chih-Heng Su, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/897,393

(22) Filed: Jun. 10, 2020

(30) Foreign Application Priority Data

Dec. 31, 2019 (TW) .................................. 108148531

(51) Int. Cl.
*G01J 1/44* (2006.01)
*G01J 1/46* (2006.01)
*G01J 1/42* (2006.01)

(52) U.S. Cl.
CPC ............... *G01J 1/46* (2013.01); *G01J 1/4204* (2013.01)

(58) Field of Classification Search
CPC ....... H04N 5/2355; H03F 3/082; H03F 3/005; G01J 1/44; G01J 2001/4406
See application file for complete search history.

(56) References Cited

U.S. PATENT DOCUMENTS 8,537,241 B2* 9/2013 Ayers ................. H04N 5/37455
348/229.1

* cited by examiner

*Primary Examiner* — Que Tan Le
(74) *Attorney, Agent, or Firm* — Li & Cai Intellectual Property (USA) Office

(57) ABSTRACT

A dynamical time gain controlling light sensing device generates a detection time configuration signal according to a light intensity indication signal, and generates a set of adjustment switch signals to respectively control the plurality of gain selection switches to be turned on or off according to a ratio of a real gain time and a simulation gain time within a detection time, such that an overall gain of a resolution adjustment circuit can correspond to an substitute gain lower than a set gain within the simulation gain time and correspond to the set gain within the real gain time, thereby generating an adjusted count result signal.

10 Claims, 5 Drawing Sheets

DYNAMIC TIME GAIN CONTROLLING LIGHT SENSING DEVICE COMPRISING A DYNAMIC TIME GAIN ADJUSTMENT MODULE TO CONTROL A PLURALITY OF GAIN SELECTION SWITCHES

CROSS-REFERENCE TO RELATED PATENT APPLICATION

This application claims the benefit of priority to Taiwan Patent Application No. 108148531, filed on Dec. 31, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensing device, and more particularly to a dynamical time gain controlling light sensing device.

BACKGROUND OF THE DISCLOSURE

Consumer electronics, such as mobile phones, are using more and more sensors to save energy and increase human-machine interaction. For example, the latest mobile phones use more than ten types of sensors. Therefore, engineers are actively seeking ways to integrate sensors to reduce energy consumption, space occupancy, and costs.

An ambient light sensor is used to sense changes in ambient light sources and change a brightness of a panel of the mobile phone. When the surrounding brightness is dark, the panel brightness will be dimmed to avoid irritating the eyes. When outdoors where the surrounding brightness is strong, a backlight module of the panel of the mobile phone will be brightened to increase visibility. The ambient light sensor changes the brightness of the panel according to the ambient light source, which can also save battery's energy and increase the duration of the mobile phone.

Although the existing light sensor can improve a resolution of sensing results by adjusting a set gain of the circuit, propagation delays in the operation of the comparator circuit used to detect the photocurrent may reduce an accuracy of the detection while increasing the gain. In addition, if the set gain is increased, the light sensor needs to continuously switch on and off at high frequencies, which causes a negative impact on power consumption.

Therefore, there is an urgent need for a light sensing device with an improved gain adjustment mechanism, which improves the accuracy of detection and reduces power consumption.

SUMMARY OF THE DISCLOSURE

In response to the above-referenced technical inadequacies, the present disclosure provides a dynamical time gain controlling light sensing device.

In one aspect, the present disclosure provides a dynamical time gain controlling light sensing device, which includes a light sensor, a first transistor, a second transistor, a resolution adjustment circuit, a storage capacitor, a comparator, a delay reset unit, a reset switch, a counter and a dynamic time gain adjustment module. The light sensor has a first terminal and a second terminal, and the second terminal of the light sensor is coupled to a ground terminal. The first transistor is connected between a first voltage and the light sensor, the second transistor is connected between the first voltage and a voltage storage node, and forms a first current mirror with the first transistor to mirror a photocurrent generated when the light sensor detects light is incident. The resolution adjustment circuit includes a plurality of gain transistors respectively connected to the first voltage and connected to the voltage storage node through a plurality of gain selection switches, respectively. The gain transistors respectively form a plurality of current mirrors with the first transistor, and the plurality of current mirrors respectively mirror the photocurrent with a plurality of gains different from each other. The storage capacitor is connected between the voltage storage node and a ground terminal. The comparator has a first input connected to the voltage storage node and a second input connected to a reference voltage. The comparator is configured to output a triggered signal when a voltage of the voltage storage node exceeds the reference voltage. The delay reset unit is configured to delay the triggered signal by a predetermined delay time to generate a reset switch signal. The reset switch is connected between the voltage storage node and the ground terminal, and has a control terminal controlled by the reset switch signal to reset the voltage of the voltage storage node. The counter is configured to count the triggered signal to generate a count value and correspondingly generate a count result signal. The dynamic time gain adjustment module includes a time and gain control register, a light intensity detection module and an arithmetic operation module. The time and gain control register is configured to generate a set of initial switching signals according to a set gain to control the gain selection switches to be turned on or off respectively, thereby controlling an overall gain of the resolution adjustment circuit to correspond to the set gain. The light intensity detection module is configured to receive the count result signal generated under the set gain to determine whether a current light intensity indicates a strong light state or a weak light state according to the count value, and correspondingly generate a light intensity indication signal. The arithmetic operation module is configured to generate a detection time configuration signal according to the light intensity indication signal, the detection time configuration signal is used to indicate a proportional configuration of a real gain time and a simulation gain time within a detection time, and the proportional configuration is stored in a register. The time and gain control register is configured to generate a set of adjustment switch signals according to the proportional configuration to control the gain selection switches to be turned on or off, such that the overall gain of the resolution adjustment circuit corresponds to a substitute gain that is lower than the set gain within the simulation gain time, and corresponds to the set gain within the real gain time. The counter is configured to count the triggered signal to generate a first adjusting count value and correspondingly generate an adjusted count result signal, wherein the adjusted count result signal is used to indicate an adjusted light intensity result.

In some embodiments, the resolution adjustment circuit includes a first gain transistor, a second gain transistor, and a third gain transistor. The first gain transistor is connected to the first voltage and connected to the voltage storage node through a first gain selection switch, and the first gain transistor and the first transistor form a second current mirror configured to mirror the photocurrent with a first gain. The second gain transistor is connected to the first voltage and connected to the voltage storage node through a second gain selection switch, and the second gain transistor and the first transistor form a third current mirror configured to mirror the photocurrent with a second gain. The third gain transistor is connected to the first voltage and connected to the voltage storage node through a third gain selection switch, and the third gain transistor and the first transistor form a fourth current mirror configured to mirror the photocurrent with a third gain.

In some embodiments, in the weak light state, the simulation gain time is shorter than the real gain time within the detection time. In the strong light state, the simulation gain time is greater than the real gain time within the detection time.

In some embodiments, in the weak light state, the simulation gain time is 25% of the detection time, and the real gain time is 75% of detection time. In the strong light state, the simulation gain time is 75% of the detection time, and the real gain time is 25% of the detection time.

In some embodiments, the light intensity detection module is configured to determine whether the count value within a pre judgment time after the detection time starts exceeds a predetermined count value, thereby determining whether the current light intensity is the strong light state or the weak light state.

In some embodiments, the pre judgment time is 25% of the detection time. In some embodiments, the arithmetic operation module is configured to multiply a portion of the first adjusted count value corresponding to the simulation gain time by a ratio of the set gain to the substitute gain, and add the first adjusted count value in the real gain time to calculate a second adjusted count value, and the adjusted light intensity result is calculated according to the second adjusted count value.

In some embodiments, the ratio is 2N, and N is an integer greater than 0. In some embodiments, the plurality of gains of the plurality of gain transistors depend on a number ratio or a size ratio of the gain transistors, respectively.

In some embodiments, in the detection time, the simulation gain time is earlier than the real gain time.

Therefore, the dynamical time gain controlling light sensing device provided by the present disclosure can provide different simulation gain time configurations in the weak light state and the strong light state, and adjust the overall gain of the resolution adjustment circuit accordingly, thereby improving linearity and detection accuracy.

In addition, by performing light detection with the substitute gain that is lower than the set gain during the simulation gain time, charge and discharge times of the storage capacitor can be reduced, that is, a pulse number of the triggered signal of the comparator can be reduced, and thus a large amount of power can be saved to achieve power saving.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
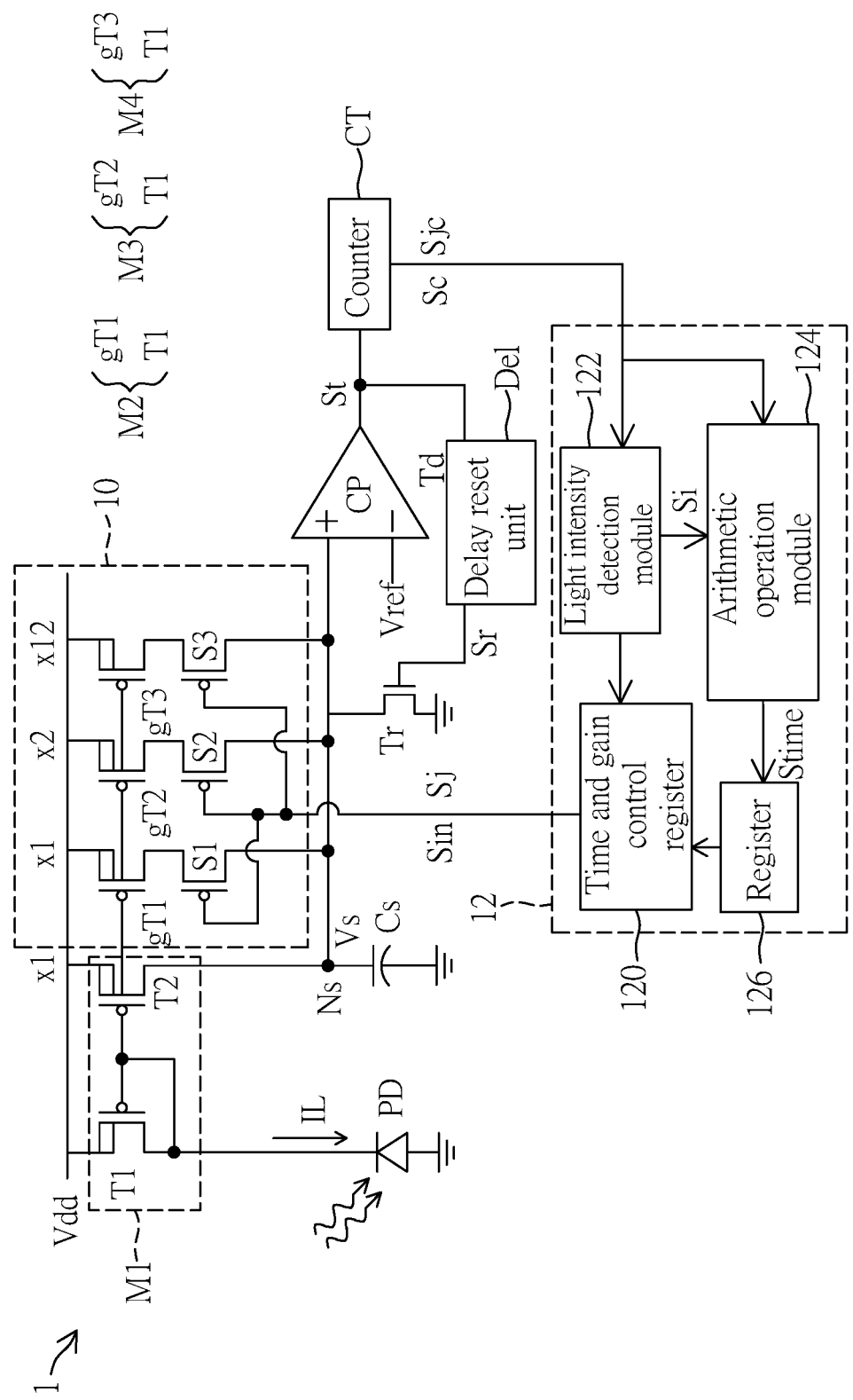
FIG. 1 is a circuit architecture diagram of a dynamical time gain controlling light sensing device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a circuit architecture diagram of a dynamical time gain controlling light sensing device according to an embodiment of the present disclosure. Referring to FIG. 1, an embodiment of the present disclosure provides a dynamical time gain controlling light sensing device 1, which includes a light sensor PD, a first transistor T1, a second transistor T2, a resolution adjustment circuit 10, a storage capacitor Cs, a comparator CP, a delay reset unit Del, a reset switch Tr, a counter CT, and a dynamic time gain adjustment module 12.

The light sensor PD can be, for example, a light sensor diode. The light sensor PD has a first terminal and a second terminal, and the second terminal of the photo sensor PD is coupled to a ground terminal. The first transistor T1 is connected between the first voltage Vdd and the photo sensor PD, the second transistor T2 is connected between the first voltage Vdd and a voltage storage node Ns, and forms a first current mirror M1 with the first transistor T1 to mirror a photocurrent IL generated when the light sensor PD detects that light is incident.

In detail, sources of the first transistor T1 and the second transistor T2 are connected to the first voltage Vdd. A gate of the first transistor T1 is connected to a gate of the second transistor T2 and a drain of the first transistor T1. A drain of the first transistor T1 is connected to the first terminal of the light sensor PD. The resolution adjusting circuit 10 can include a plurality of gain transistors, which are respectively connected to the first voltage Vdd and respectively connected to the voltage storage node Ns through a plurality of gain selection switches. These gain transistors form a plurality of current mirrors with the first transistor T1, respectively, and mirror the photocurrent IL with a plurality of different gains, respectively. In circuit architectures of the current mirrors, the gains of the gain transistors depend on the number ratio or size ratio of the transistors, respectively.

In the present embodiment, the resolution adjustment circuit 10 can include a first gain transistor gT1, a second gain transistor gT2, and a third gain transistor gT3. The first gain transistor gT1 is connected to the first voltage Vdd and is connected to the voltage storage node Ns through the first gain selection switch S1. The first gain transistor gT1 and the first transistor T1 form a second current mirror M2, which mirrors the photocurrent IL with a first gain, such as 1λ.

The second gain transistor gT2 is connected to the first voltage Vdd, and is connected to the voltage storage node Ns through the second gain selection switch S2. The second gain transistor gT2 and the first transistor T1 form a third current mirror M3, which mirrors the photocurrent IL with a second gain, such as 2×.

Similarly, the third gain transistor gT3 is connected to the first voltage Vdd, and is connected to the voltage storage node Ns through the third gain selection switch S3. The third gain transistor gT3 and the first transistor T1 form a fourth current mirror M4, which mirrors the photocurrent IL with a third gain, such as 12λ.

The storage capacitor Cs is connected between the voltage storage node Ns and a ground terminal, and is used for storing a storage voltage Vs of the voltage storage node Ns.

A first input of the comparator CP is connected to the voltage storage node Ns, and a second input of the comparator CP is connected to the reference voltage Vref. The comparator CP is configured to output a triggered signal St when the voltage of the voltage storage node Ns exceeds the reference voltage Vref, and the delay reset unit Del is configured to delay the triggered signal St by a predetermined delay time Td to generate a reset switch signal Sr.

The reset switch Tr is connected between the voltage storage node Ns and the ground terminal, and a control terminal of the reset switch is controlled by the reset switch signal Sr to reset the voltage of the voltage storage node Ns. For example, when the voltage of the voltage storage node Ns exceeds a reference voltage Vref, after a delay time Td, the triggered signal St generates a reset switch signal Sr to trigger the reset switch Tr to refresh and reset the storage voltage Vs of the voltage storage node Ns.

The counter CT is configured to count the triggered signal St to generate a count value, and correspondingly generate a count result signal Sc.

Figure 2A:
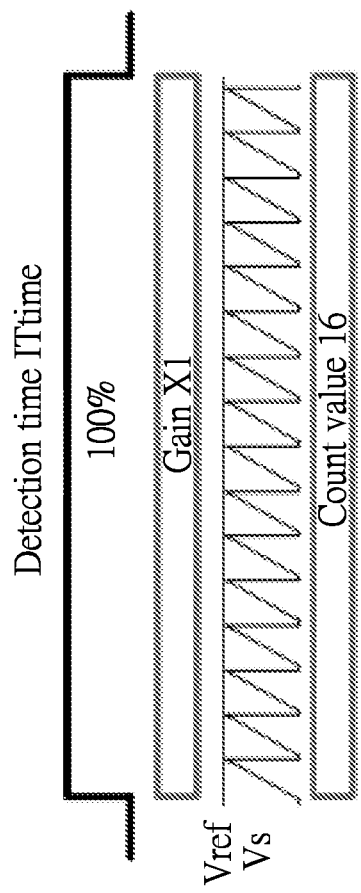
FIGS. 2A and 2B are schematic diagrams of a storage voltage, a reference voltage, and a count value generated at different gains set under the same light intensities.
Figure 2B:
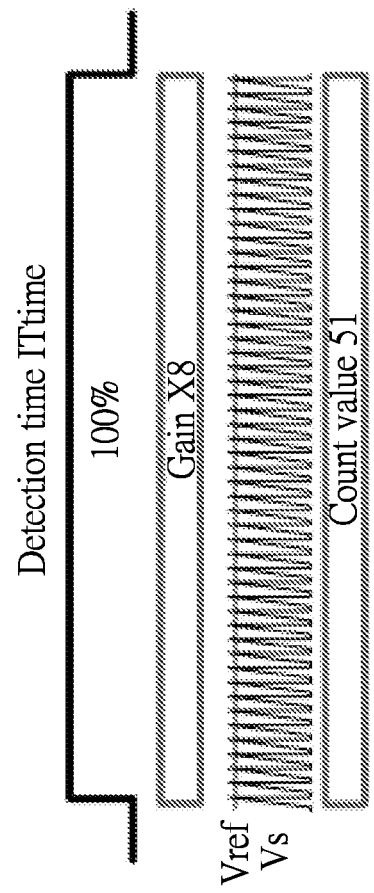

Reference is further made to FIGS. 2A and 2B, which are schematic diagrams of a storage voltage, a reference voltage, and a count value generated at different gains set under the same light intensities. As shown in FIG. 2A, when a fixed gain is used in detection time ITtime, under low gain conditions, such as when the gain is 1λ, a count value of 16 can be detected within the detection time ITtime. However, when the gain is increased to 8λ, the count value should theoretically be 8 times the count value when the gain is 1λ, and the count value should be 16×8=128. However, since a circuit of the comparator CT may be delayed during operation, and the charging and discharging for the storage voltage Vs is slowed due to the delay of the switching time of the reset switch Tr, only the count value of 51 can be detected, resulting in poor linearity.

Therefore, the present disclosure additionally provides a dynamic time gain adjustment module 12, which includes a time and gain control register 120, a light intensity detection module 122, and an arithmetic operation module 124. The time and gain control register 120 is configured to generate a set of initial switching signals Sin according to the set gain to control the gain selection switches (for example, the first gain selection switch 51, the second gain selection switch S2, and the third gain selection switch S3) to be turned on or off, so that the overall gain of the resolution adjustment circuit 10 corresponds to the set gain.

For example, when the set gain is 16×, the time and gain control register 120 is configured to generate a set of initial switching signals Sin according to the set gain to control the first gain selection switch 51, the second gain selection switch S2, and the third gain selection switch S3 to be turned on, so that the overall gain of the resolution adjustment circuit 10 is 16×.

The light intensity detection module 122 receives the count result signal Sc generated under the set gain, and determines whether a current light intensity is a strong light state or a weak light state according to the count value, and correspondingly generates a light intensity indication signal Si. It should be noted that the current light intensity can be a light intensity of ambient light.

The arithmetic operation module 124 is configured to generate a detection time configuration signal Stime according to the light intensity indication signal Si. The detection time configuration signal Stime is used to indicate a proportional configuration of the real gain time Realtime and the simulation gain time SimuTime within the detection time ITtime, and the proportional configuration is stored in a register 126.

The time and gain control register 120 is configured to generate a set of adjustment switch signals Sj according to the proportional configuration to control the gain selection switches to be turned on or off, respectively, such that the overall gain of the resolution adjustment circuit 10 corresponds to a substitute gain that is lower than the set gain within the simulation gain time SimuTime, and corresponds to the set gain within the real gain time Realtime.

The counter CT is configured to count the triggered signal St to generate a first adjusted count value and correspondingly generate an adjusted count result signal Sjc, and the adjusted count result signal Sjc is used to indicate an adjusted light intensity result.

Figure 3:
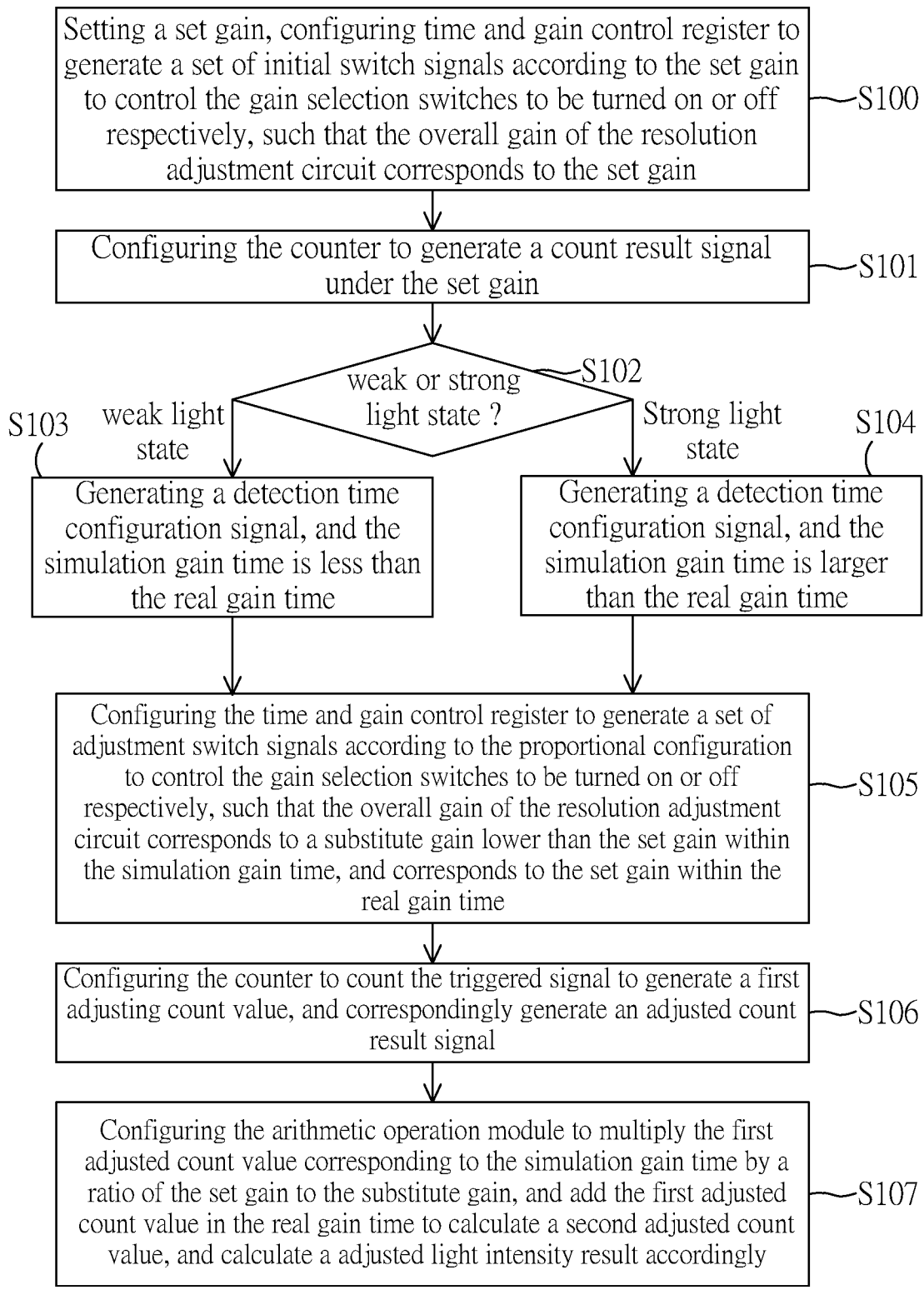
FIG. 3 is a flowchart of a dynamic control gain time process according to an embodiment of the present disclosure.

In detail, the above configuration can further refer to FIG. 3, which is a flowchart of a dynamic control time gain process according to an embodiment of the present disclosure. As shown in FIG. 3, the dynamic control time gain process can include the following steps:

Step S100: Setting a set gain, configuring time and gain control register 120 to generate a set of initial switch signals Sin according to the set gain to control the gain selection switches to be turned on or off respectively, such that the overall gain of the resolution adjustment circuit 10 corresponds to the set gain.

Step S101: Configuring the counter CT to generate a count result signal Sc under the set gain.

Step S102: Configuring the light intensity detection module 122 to determine whether the current light intensity is a strong light state or a weak light state according to the count value of the count result signal Sc, and correspondingly generate a light intensity indication signal Si. In some embodiments, the light intensity detection module 122 is configured to determine whether the count value within a pre judgment time after a start of the detection time ITtime exceeds a predetermined count value, thereby determining whether the current light intensity is a strong light state or a weak light state. For example, the pre judgment time can be 25% of the detection time ITtime.

In response to the current light intensity being determined as in the weak light state, the process proceeds to step S103: configuring the arithmetic operation module 124 to generate a detection time configuration signal Stime according to the light intensity indication signal Si, and the simulation gain time SimuTime within the detection time ITtime is less than the real gain time Realtime.

In response to the current light intensity being determined as in the strong light state, the process proceeds to step S104: Configuring the arithmetic operation module 124 to generate a detection time configuration signal Stime according to the light intensity indication signal Si, and the simulation gain time SimuTime within the detection time ITtime is larger than the real gain time Realtime.

For example, under the weak light state, the simulation gain time SimuTime can be 25% of the detection time ITtime, and the real gain time Realtime can be 75% of the detection time ITtime. Under the strong light state, the simulation gain time SimuTime can be 75% of the detection time ITtime, and the real gain time Realtime can be 25% of the detection time ITtime.

Step S105: Configuring the time and gain control register 120 to generate a set of adjustment switch signals Sj according to the proportional configuration to control the gain selection switches to be turned on or off respectively, such that the overall gain of the resolution adjustment circuit 10 corresponds to a substitute gain lower than the set gain within the simulation gain time SimuTime, and corresponds to the set gain within the real gain time Realtime. Furthermore, in the detection time ITtime, the simulation gain time SimuTime is earlier than the real gain time Realtime.

Step S106: Configuring the counter CT to count the triggered signal St to generate a first adjusting count value, and correspondingly generate an adjusted count result signal Sjc.

Step S107: Configuring the arithmetic operation module 124 to multiply the first adjusted count value corresponding to the simulation gain time Simutime by a ratio of the set gain to the substitute gain, and add the first adjusted count value in the real gain time Realtime to calculate a second adjusted count value, and calculate an adjusted light intensity result accordingly. In some embodiments, the ratio is 2N, and N is an integer greater than 0.

Figure 4A:
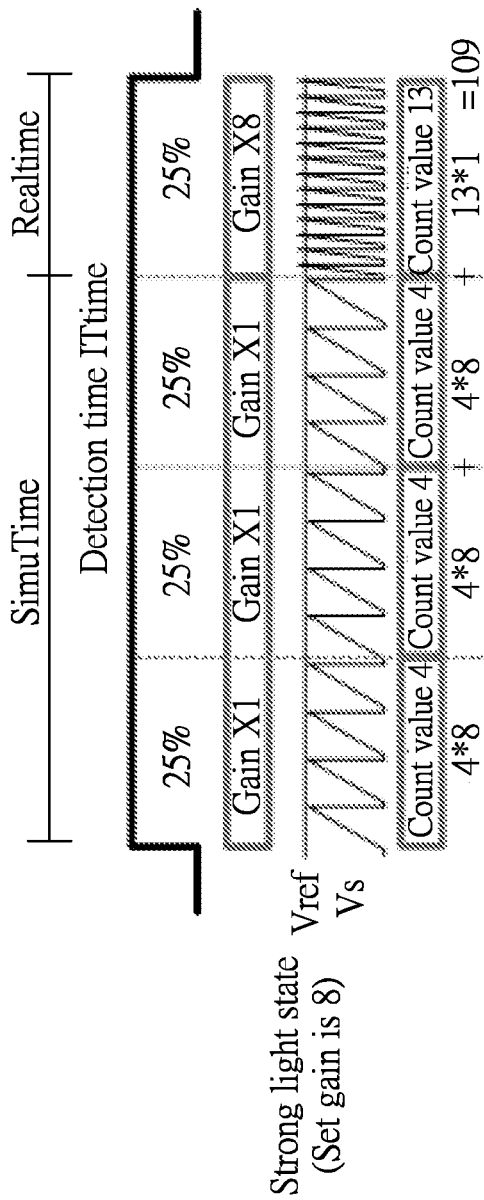
FIGS. 4A and 4B are schematic diagrams of signal timing and a calculation result of a second adjustment count value respectively in a strong light state and a weak light state according to an embodiment of the present disclosure.
Figure 4B:
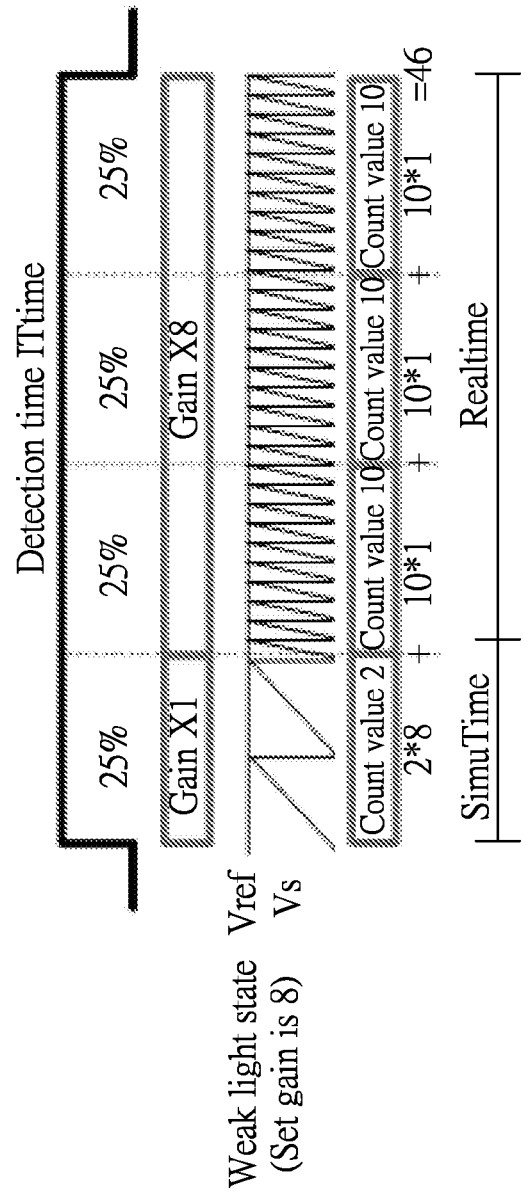

Reference is further made to FIGS. 4A and 4B, which are schematic diagrams of signal timing and a calculation result of a second adjustment count value respectively in a strong light state and a weak light state according to an embodiment of the present disclosure. As shown in FIG. 4A, in the strong light state, the simulation gain time SimuTime is 75% of the detection time ITtime, the real gain time Realtime is 25% of the detection time ITtime, and the set gain is 8× and the substitute gain is 1λ. Therefore, within the simulation gain time SimuTime (75% of the detection time ITtime), the first adjusted count values obtained are all 4, which are further multiplied by a ratio (which is 8) of the set gain 8× to the substitute gain 1λ, and added the first adjusted count value (which is 13) obtained in the real gain time Realtime (25% of the detection time ITtime), and the second adjusted count value of 109 can be obtained. Therefore, compared with the count value of 51 obtained by using a fixed gain of 8λ, as shown in FIG. 2B, the result of the present disclosure will be closer to a count value of 128 obtained by using the fixed gain of 8× under the strong light state, for example, the result shown in 2A is multiplied by 8 times.

On the other hand, in the weak light state, the simulation gain time SimuTime is 25% of the detection time ITtime, the real gain time Realtime is 75% of the detection time ITtime, and the set gain is 8× and the substitute gain is 1λ. Therefore, within the simulation gain time SimuTime (25% of the detection time ITtime), the first adjusted count value obtained is 2, which is further multiplied by a ratio (which is 8) of the set gain 8× to the substitute gain 1λ, and added the first adjusted count values (which are all 10) obtained in the real gain time Realtime (75% of the detection time ITtime), and the second adjusted count value of 46 can be obtained.

Figure 5:
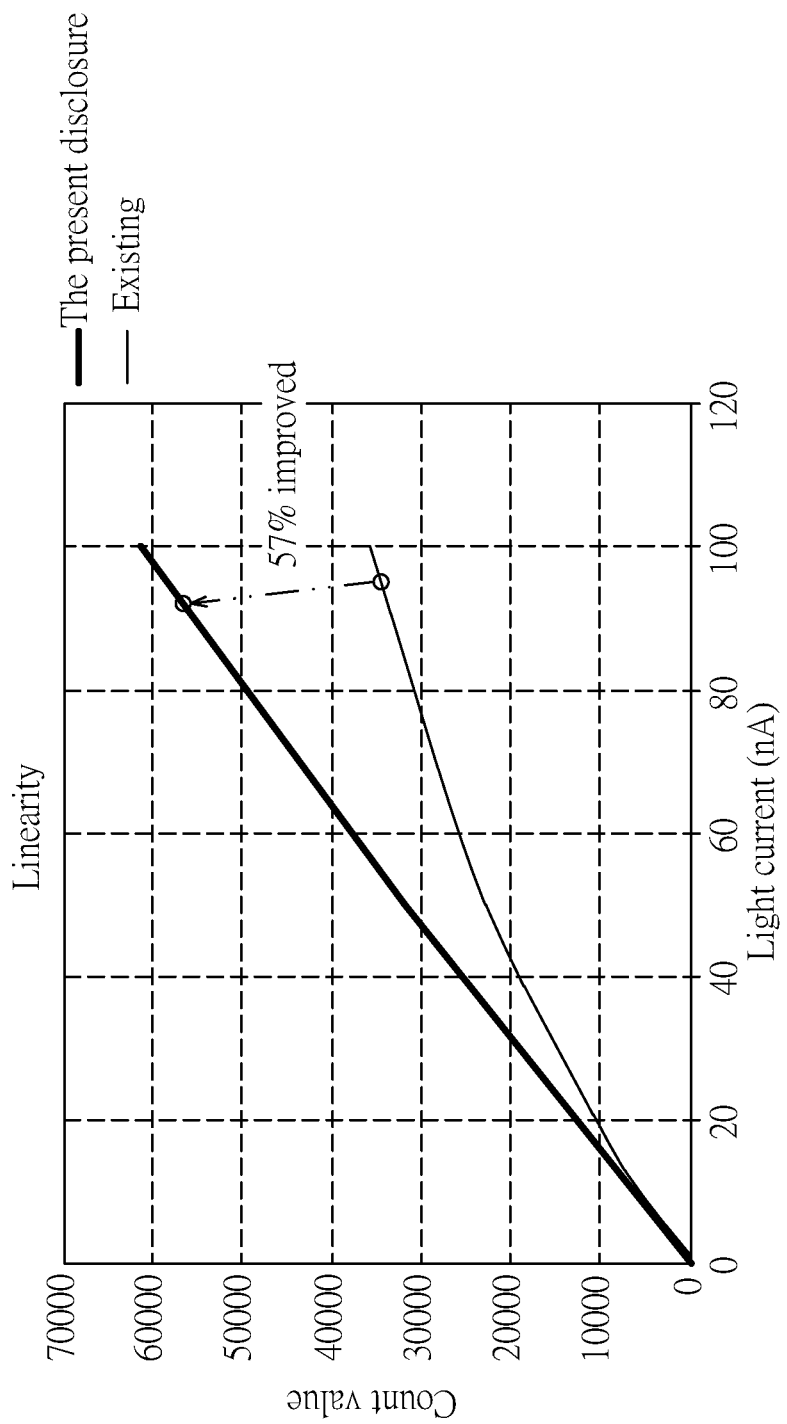
FIG. 5 is a plot diagram of counts versus current of light sensor of an existing light sensor and a light sensor improved by the dynamical time gain controlling light sensing device provided by an embodiment of the present disclosure.

Reference is further made to FIG. 5, which is a plot diagram of counts versus current of light sensor of an existing light sensor and a light sensor improved by the dynamical time gain controlling light sensing device provided by an embodiment of the present disclosure. As shown in FIG. 5, the existing light sensor has poor linearity due to factors such as the propagation delay caused by the comparator circuit during operation and the reset speed of the stored voltage is too slow. In contrast, the dynamical time gain controlling light sensing device provided by the present disclosure can provide different simulation gain time configurations in weak light and strong light states, and adjusts the overall gain of the resolution adjustment circuit accordingly, which can further improve the linearity by up to 57%.

In conclusion, the dynamical time gain controlling light sensing device provided by the present disclosure can provide different simulation gain time configurations in the weak light state and the strong light state, and adjust the overall gain of the resolution adjustment circuit accordingly, thereby improving linearity and detection accuracy.

In addition, by performing light detection with the substitute gain that is lower than the set gain during the simulation gain time, charge and discharge times of the storage capacitor can be reduced, that is, a pulse number of the triggered signal of the comparator can be reduced, and thus a large amount of power can be saved to achieve power saving.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic time gain controlling light sensing device, comprising:
   a light sensor having a first terminal and a second terminal, wherein the second terminal of the light sensor is coupled to a ground terminal;
   a first transistor connected between a first voltage and the light sensor;
   a second transistor connected between the first voltage and a voltage storage node, and forming a first current mirror with the first transistor to mirror a photocurrent generated when the light sensor detects light being incident;
   a resolution adjustment circuit including a plurality of gain transistors respectively connected to the first voltage and connected to the voltage storage node through a plurality of gain selection switches, respectively, wherein the gain transistors respectively form a plurality of current mirrors with the first transistor, and the plurality of current mirrors respectively mirror the photocurrent with a plurality of gains different from each other;
   a storage capacitor connected between the voltage storage node and a ground terminal;
   a comparator having a first input connected to the voltage storage node and a second input connected to a reference voltage, wherein the comparator is configured to output a triggered signal when a voltage of the voltage storage node exceeds the reference voltage;
   a delay reset unit configured to delay the triggered signal by a predetermined delay time to generate a reset switch signal;
   a reset switch connected between the voltage storage node and the ground terminal, and having a control terminal controlled by the reset switch signal to reset the voltage of the voltage storage node;
   a counter configured to count the triggered signal to generate a count value and correspondingly generate a count result signal; and
   a dynamic time gain adjustment module, including:
      a time and gain control register configured to generate a set of initial switching signals according to a set gain to control the gain selection switches to be turned on or off respectively, thereby controlling an overall gain of the resolution adjustment circuit to correspond to the set gain;
      a light intensity detection module configured to receive the count result signal generated under the set gain to determine whether a current light intensity indicates a strong light state or a weak light state according to the count value, and correspondingly generate a light intensity indication signal; and
      an arithmetic operation module configured to generate a detection time configuration signal according to the light intensity indication signal, wherein the detection time configuration signal is used to indicate a proportional configuration of a real gain time and a simulation gain time within a detection time, and the proportional configuration is stored in a register,
   wherein the time and gain control register is configured to generate a set of adjustment switch signals according to the proportional configuration to control the gain selection switches to be turned on or off, such that the overall gain of the resolution adjustment circuit corresponds to a substitute gain that is lower than the set gain within the simulation gain time, and corresponds to the set gain within the real gain time; and
   wherein the counter is configured to count the triggered signal to generate a first adjusted count value and correspondingly generate an adjusted count result signal, wherein the adjusted count result signal is used to indicate an adjusted light intensity result.

2. The dynamical time gain controlling light sensing device according to claim 1, wherein the resolution adjustment circuit includes:
   a first gain transistor connected to the first voltage and connected to the voltage storage node through a first gain selection switch, wherein the first gain transistor and the first transistor form a second current mirror configured to mirror the photocurrent with a first gain;
   a second gain transistor connected to the first voltage and connected to the voltage storage node through a second gain selection switch, wherein the second gain transistor and the first transistor form a third current mirror configured to mirror the photocurrent with a second gain; and
   a third gain transistor connected to the first voltage and connected to the voltage storage node through a third gain selection switch, wherein the third gain transistor and the first transistor form a fourth current mirror configured to mirror the photocurrent with a third gain.

3. The dynamical time gain controlling light sensing device according to claim 1, wherein in the weak light state, the simulation gain time is shorter than the real gain time within the detection time; and
   wherein in the strong light state, the simulation gain time is greater than the real gain time within the detection time.

4. The dynamical time gain controlling light sensing device according to claim 3, wherein in the weak light state, the simulation gain time is 25% of the detection time, and the real gain time is 75% of detection time; and
   wherein in the strong light state, the simulation gain time is 75% of the detection time, and the real gain time is 25% of the detection time.

5. The dynamical time gain controlling light sensing device according to claim 1, wherein the light intensity detection module is configured to determine whether the count value within a pre judgment time after the detection time starts exceeds a predetermined count value, thereby determining whether the current light intensity indicates the strong light state or the weak light state.

6. The dynamical time gain controlling light sensing device according to claim 5, wherein the pre judgment time is 25% of the detection time.

7. The dynamical time gain controlling light sensing device according to claim 1, wherein the arithmetic operation module is configured to multiply a portion of the first adjusted count value corresponding to the simulation gain time by a ratio of the set gain to the substitute gain, and add the first adjusted count value in the real gain time to calculate a second adjusted count value, and the adjusted light intensity result is calculated according to the second adjusted count value.

8. The dynamical time gain controlling light sensing device according to claim 7, wherein the ratio is 2N, and N is an integer greater than 0.

9. The dynamical time gain controlling light sensing device according to claim 1, wherein the plurality of gains of the plurality of gain transistors depend on a number ratio or a size ratio of the gain transistors, respectively.

10. The dynamical time gain controlling light sensing device according to claim 1, wherein in the detection time, the simulation gain time is earlier than the real gain time.

* * * * *